Dec. 29, 1942.     A. C. TURTLE     2,306,574
VOLTAGE REGULATING APPARATUS
Filed June 23, 1939     3 Sheets-Sheet 1

INVENTOR
A.C.TURTLE
BY J.D.O'Connell
ATTORNEY

Dec. 29, 1942.  A. C. TURTLE  2,306,574
VOLTAGE REGULATING APPARATUS
Filed June 23, 1939  3 Sheets—Sheet 3

INVENTOR
A. C. TURTLE
BY J. D. O'Connell
ATTORNEY

Patented Dec. 29, 1942

2,306,574

UNITED STATES PATENT OFFICE 2,306,574

VOLTAGE REGULATING APPARATUS

Alfred C. Turtle, Montreal, Quebec, Canada

Application June 23, 1939, Serial No. 280,842

2 Claims. (Cl. 171—225)

This invention relates to systems of electrical distribution and has for its object the provision of efficient voltage regulating means whereby the voltage of load circuits, such as the lamp circuits of a railway car lighting system, may be maintained approximately constant throughout a wide range of voltage fluctuations, in either direction, at the energizing source; or may be varied to values substantially above or substantially below the maximum voltage available at the terminals of said source.

According to the invention, the primary windings of a plurality of transformers are connected to a source of energy through the conducting bars and brushes of a potential commutator of the closed circuit type, the secondary windings of the transformers being connected to said source in series with a load circuit through a second or "current" commutator which is also of the closed circuit type; the transformer connections at the commutators being made so that the load voltage may be regulated by (1) changing the relative angular positions of the conducting bars of the two commutators; (2) varying the resistance of the primary circuit through the agency of a variable resistance connected in series with the source of current and the potential commutator; or (3) varying both the resistance of the primary circuit and the relative angular placement of the conducting bars of the two commutators.

Proceeding now to a more detailed description reference will be had to the accompanying drawings, in which—

Figure 1:
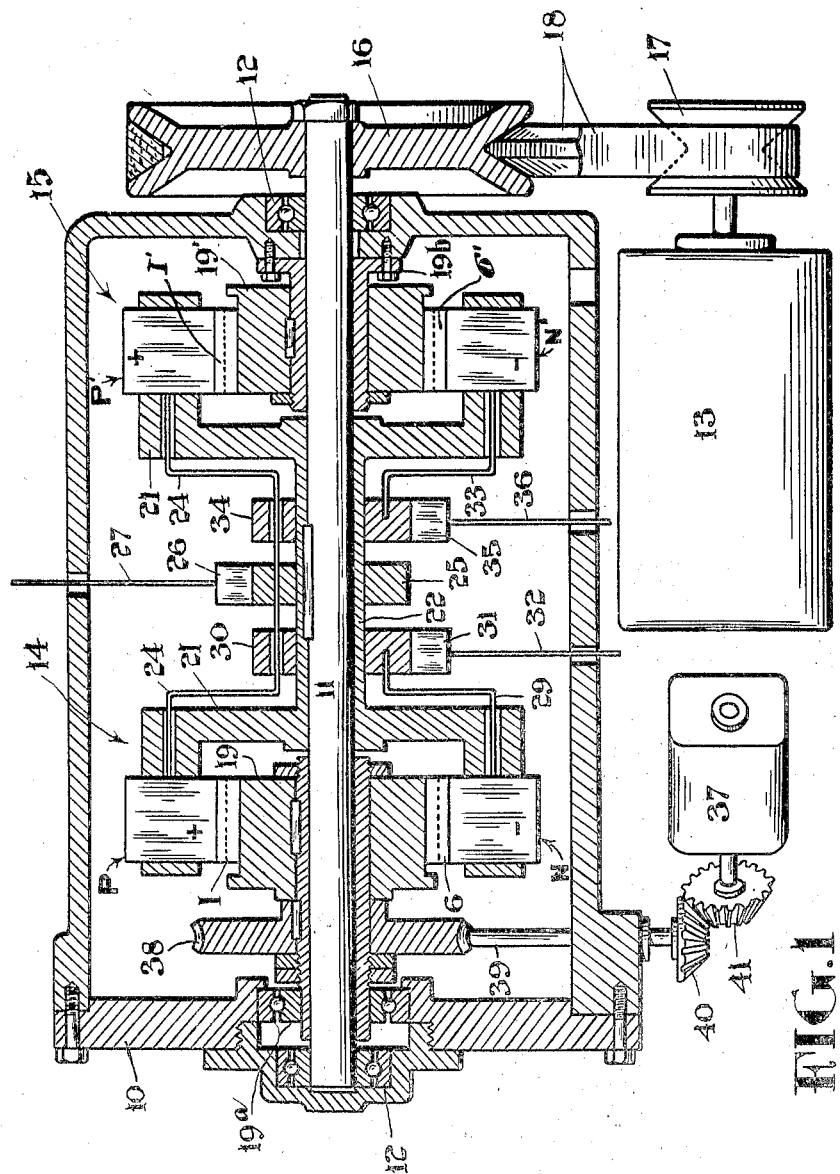
Fig. 1 is a longitudinal sectional view showing one method of mounting and operating the "potential" and "current" commutators.

Referring to Figure 1, 10 designates a casing containing shaft 11 journalled in suitable bearings 12. This shaft is driven by a main driving motor 13 and carries component parts of two commutators generally indicated at 14 and 15. The drive connection between shaft 11 and motor 13 may be of any suitable type. In the present instance I have shown a belt connection comprising pulleys 16 and 17 connected by a drive belt 18.

For convenient differentiation the commutators 14 and 15 are hereinafter referred to as the "potential" and "current" commutators respectively. The commutator 14 includes eight insulated conducting bars or segments 1, 2, 3, 4, 5, 6, 7 and 8 (see Figs. 2 to 5 inclusive) arranged in circular series on an insulated stator 19 through which shaft 11 extends. The commutator 15 includes similar contacts 1', 2', 3', 4', 5', 6', 7' and 8' arranged around an insulated stator 19'. The positive and negative brushes of each commutator are carried by a brush holder 21 from which the brushes are suitably insulated. The two brush holders 21 are joined together by a sleeve 22 fixed to revolve with shaft 11. The two positive brushes P and P' are connected to the positive side of a direct current source 23 (Figs. 1 and 2) through conductors 24, slip ring 25, slip ring brush 26 and conductor 27. The negative brush N of the "potential" commutator 14 is connected to the negative side of current source 23 through conductor 29, slip ring 30, slip ring brush 31 and conductor 32. The negative brush N' of the "current" commutator 15 is connected, through conductor 33, slip ring 34, slip ring brush 35 and conductor 36, to one side of a load circuit L, the remaining side of which is connected to the negative side of the direct current source 23.

Stator 19 of "potential" commutator 14 is rotatably mounted in bearings 19a so that it may be turned about shaft 11 to change the angular displacement of its contact bars 1, 2, 3, etc., with relation to the corresponding contact bars of the "current" commutator 15, the stator 19' of the latter being secured against rotation as indicated at 19b so that the contact bars carried thereby always remain in the same position.

Changes in the angular displacement of the contact bars of "potential" commutator 14 with relation to the contact bars of "current" commutator 15 are effected automatically through the agency of a reversible control motor 37 geared to the "potential" commutator stator 19. As here shown said stator 19 is provided with a worm wheel 38 meshing with a worm 38' carried by one end of countershaft 39. A bevel pinion 40 on the other end of shaft 39 is driven by a bevel pinion 41 fixed to the armature shaft of motor 37.

The conducting bars of the "potential" and "current" commutators are connected to primary and secondary windings, respectively, of four transformers T, T', $T^2$ and $T^3$. In the present instance each transformer is represented by two primary windings and two secondary windings wound in the same direction on the iron core as indicated by the letter S marking the start of each winding and the letter E marking the end of each winding.

As illustrated in Figs. 2 to 5 inclusive, the primary windings of the transformers are connected across the contact bars of potential commutator 14 in the following manner. The S ends of windings A and A' of transformer T are respectively connected to bars 1 and 6, the E ends being respectively connected to bars 2 and 5. The S ends of windings B and B' of transformer T' are respectively connected to bars 2 and 7 while the E ends are respectively connected to bars 3 and 6. The S ends of windings C and C' of transformer $T^2$ are respectively connected to bars 3 and 8, the E ends being respectively connected to bars 4 and 7. The S ends of windings D and D' of transformer $T^3$ are respectively connected to bars 4 and 1, the E ends being respectively connected to bars 5 and 8.

The connections between the secondary transformer windings and the conductor bars of "current" commutator 15 are made as follows. The S ends of windings $A^2$ and $A^3$ of transformer T are respectively connected to bars 7' and 8', the E ends being respectively connected to bars 3' and 4'. The S ends of windows $B^2$ and $B^3$ of transformer T' are respectively connected to bars 8' and 1', the E ends being respectively connected to bars 4' and 5'. The S ends of windings $C^2$ and $C^3$ of transformer $T^2$ are respectively connected to bars 1' and 2', the E ends being respectively connected to bars 5' and 6'. The S ends of windings $D^2$ and $D^3$ of transformer $T^3$ are respectively connected to bars 2' and 3', the E ends being respectively connected to bars 6' and 7'.

By virtue of the connections described herein the primary and secondary windings of the transformers are connected across the direct current source 23 with the secondary windings in series with the load circuit L.

Figure 2:
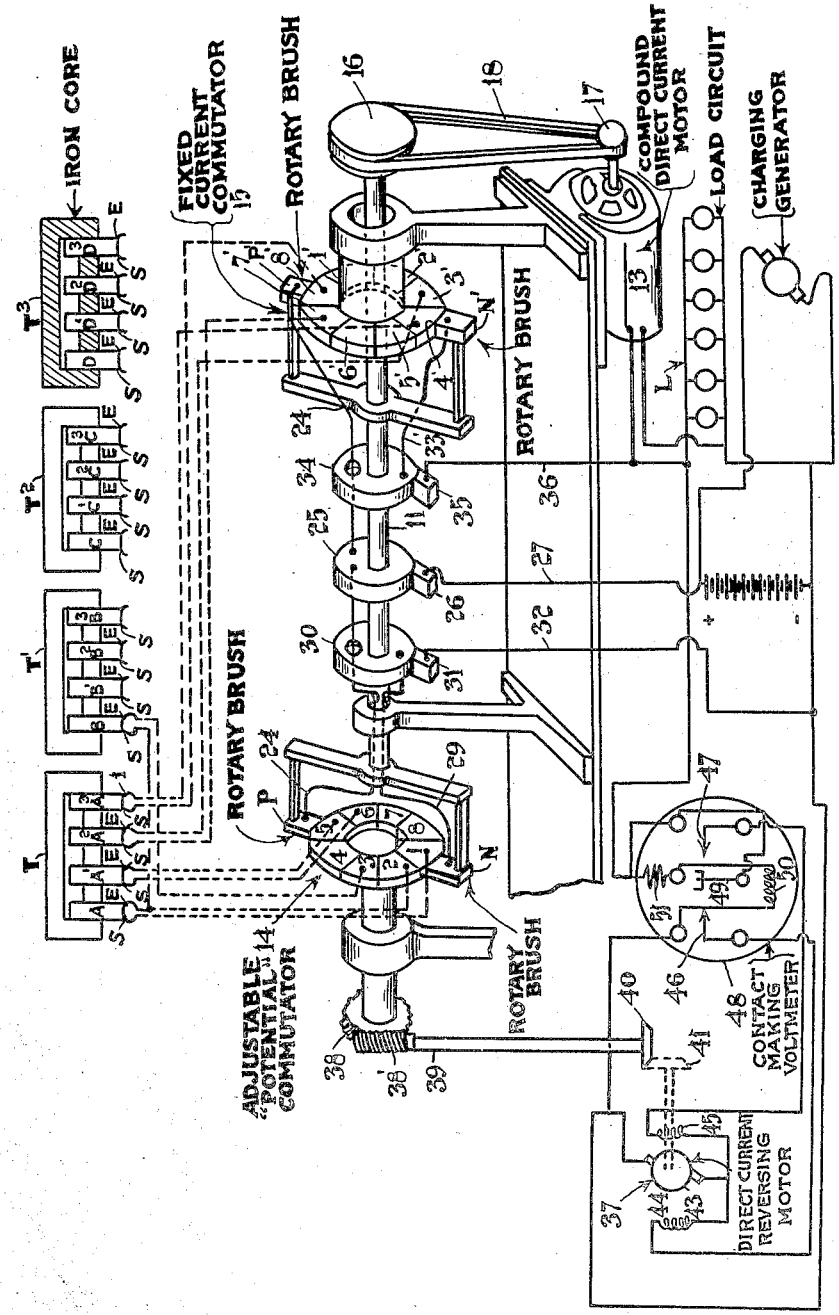
Fig. 2 is a diagrammatic view showing the manner in which the commutators and the commutator operating and controlling motors are connected in circuit with the source of current and the load circuit. This view also indicates the manner in which the transformer connections are made at the "potential" and "current" commutators.

The positive and negative brushes of the two commutators are revolved at the same speed by the motor 13 which is connected to the direct current source 23 as shown in Fig. 2. The operating speed of motor 8 varies with the voltage across the terminals of the direct current source.

Control motor 37 is represented in Fig. 2 by armature 43 and field windings 44 and 45. One terminal of each field winding is connected through armature 43 to one side of load circuit L. The remaining ends of field windings 44 and 45 are respectively connected to contacts 46 and 47 of a volt meter type relay 48, whose armature 49 is connected to the opposite side of load circuit L. Relay 48 is relatively dead beat and has its operating coil 50 connected across load circuit L in series with a resistance 51.

When the voltage across load circuit L falls below a predetermined value relay armature 49 moves to the left and engages relay contact 46. This energizes motor armature 43 and field winding 44 so that motor 37 and the conducting bars of "potential" commutator 14 are revolved in an anti-clockwise direction. Similarly, when the voltage across the load circuit exceeds said predetermined value the relay armature 49 moves to the right and engages contact 47. This energizes armature 43 and field winding 45 so that motor 37 and the conducting bars of commutator 14 are revolved in a clockwise direction.

When the voltage across the load circuit is at the correct value, as predetermined by initial setting of relay 48, the relay armature 49 occupies a neutral position between relay contacts 44 and 45 so that both field windings of control motor 37 are open-circuited.

Depending on the angular position of the contact bars of "potential" commutator 14 in relation to the angular position of the corresponding contact bars of "current" commutator 15, the transformers T, T', $T^2$ and $T^3$ have either a "bucking" or "boosting" effect on the voltage imposed on load circuit L by the direct current source 23. In the present instance the maximum "bucking" effect is obtained when corresponding conducting bars of the two commutators occupy the relative angular positions shown in Fig. 3. The maximum "boosting" effect is obtained when the conducting bars of "potential" commutators 14 are rotated in an anti-clockwise direction through an angle of 180° from the position shown in Fig. 3 to the position shown in Fig. 5. When the transformers are "boosting" the voltage to the maximum degree their effect in the direct current circuit is very similar to the effect of transformers used in alternating current lighting and power distribution systems. When the maximum "bucking" effect is being obtained the transformers are functioning as reactances or choke coils and their effect in the direct current circuit is very similar to the effect of a variable resistance except that the transformers are more efficient.

Figure 3:
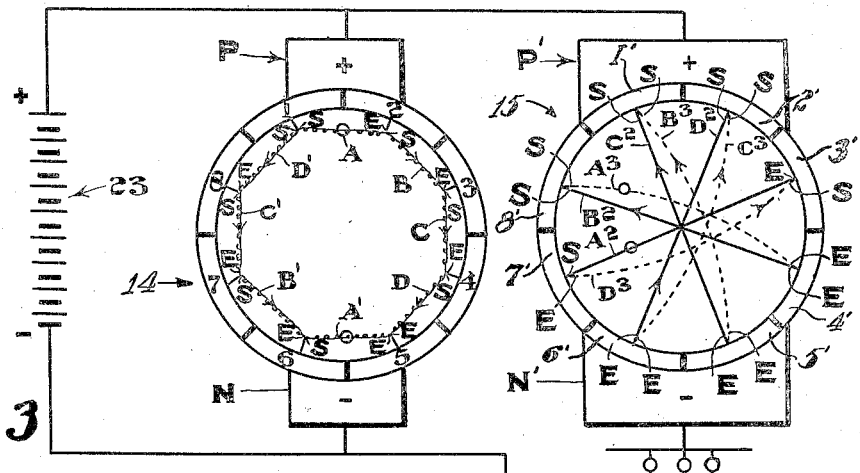
Fig. 3 is a wiring diagram showing diagrammatically the angular position of the conducting bars of the "potential" commutator in relation to the bars of the "current" commutator when the transformers are exerting their maximum voltage "bucking" effect.
Figure 4:
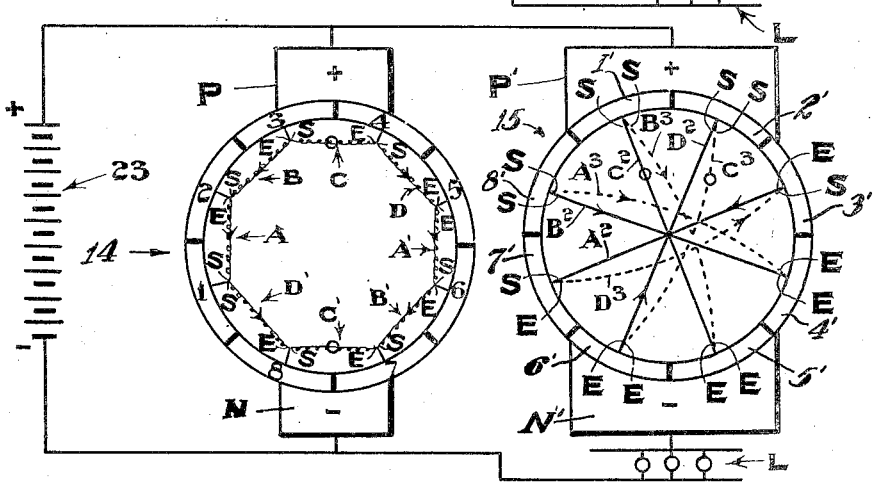
Fig. 4 is a view similar to Fig. 3 but showing the relative angular position of the conducting bars of the two commutators when the transformers are having their minimum effect on the direct current voltage.
Figure 5:
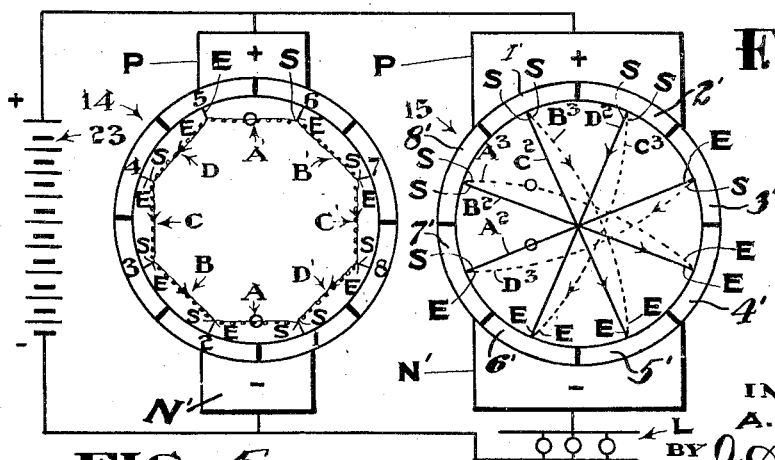
Fig. 5 is a view similar to Figs. 3 and 4 but showing the relative angular position of the conducting bars of the two commutators when the transformers are exerting their maximum voltage "boosting" effect.

Obviously, the voltage of the secondary windings of the transformers is added to or subtracted from the direct current feeder voltage in varying degrees as the conductor bars of the "potential" commutator 14 are shifted to various positions intermediate the two extreme positions shown in Figs. 3 and 5. A neutral position, in which the voltage induced in the secondary windings, has a minimum effect on the feeder voltage, is achieved when the conducting bars of the "potential" commutator are turned through an angle of 90° to the position shown in Fig. 4.

The direction of current flow in the primary and secondary windings of the transformers is indicated by arrow heads in Figs. 3 to 5 inclusive. The symbols O, appearing in these figures, indicate that the primary windings to which they are applied are short-circuited by the "potential" commutator brushes and that the secondary windings to which they are applied have very little energy flowing therethrough.

Reverting to Fig. 3, it will be noted that the primary windings A and A' of transformer T are short circuited so that very little energy is flowing through the secondary windings $A^2$ and $A^3$ of this transformer. On the other hand, current is flowing through the primary windings B, B'; C, C'; and D, D' of transformers T', $T^2$ and $T^3$ are indicated by the arrow heads. A secondary component of this current therefore flows, in the direction of the arrow heads, through the secondary windings $B^2$, $B^3$; $C^2$, $C^3$; and $D^2$, $D^3$ of transformers T', $T^2$ and $T^3$ so that the voltage of these transformers "bucks" or is subtracted from the direct current feeder voltage.

When the conductor bars of "potential" commutator 14 are turned, through an angle of 180°, from the position shown in Fig. 3 to that shown in Fig. 5, the primary windings A and A' of transformer T change positions and are again short-circuited by the "potential" commutator brushes so that very little energy flows through the secondary windings $A^2$ and $A^3$ of this transformer. The primary windings of the remaining transformers have also changed positions so that the current flow through these windings is reversed, being now from the E to the S ends instead of from the S to the E ends as shown in Fig. 3. This produces a corresponding reversal of current flow in the secondary windings of transformers T', $T^2$ and $T^3$ with the result that the voltage of these transformers now "boosts" or is added algebraically to the direct current voltage.

When the conductor bars of "potential" commutator 14 are turned through an angle of 90°, i. e. to a neutral position intermediate the extreme bucking and boosting positions shown in Figs. 3 and 5, the current direction through the primary and secondary windings of the transformer is substantially as represented in Fig. 4. In this case the secondary windings $C^2$ and $C^3$ of transformer $T^2$ are connected across the brushes of "current" commutator 15 but very little induced energy is flowing through these windings owing to short-circuiting of the primary windings C and C' by the brushes of the "potential" commutator. It will also be readily seen that the "boosting" effect of the induced energy in secondary winding $B^3$ of transformer T' is nullified by the "bucking" effect of the induced energy in secondary winding $D^2$ of transformer $T^3$.

The fact that the brushes are rotating around the conducting bars of the commutators does not affect the principle of operation as explained in connection with Figs. 3 to 5 inclusive. It may be noted however, that the direction of brush rotation should be such, in relation to the transformer connections, that the current flowing in the secondary windings will induce an opposing current in those primary windings which, at any given instant, are being transposed from a shunted to a series-connected position. In this way the voltage which tends to produce sparking between the "potential" commutators brushes and the conducting segments which the brushes are leaving at any instant is opposed and nullified by said induced currents.

It may also be noted, at this point, that the effect of using a plurality of transformers when "boosting" the direct current voltage is to impose a number of positive impulses in the same direction as the direct current in the load circuit due to the fact that the brushes of both commutators are revolving in the same direction and tend to maintain unidirectional flow of energy through the brushes of the "current" commutator in the same direction as the current coming from the direct current source. This condition is maintained to a certain degree until the conducting bars of the "potential" commutator are shifted to a position where there is a definite proportion of "bucking" effect. It may also be noted that the use of a number of transformers, connected as described herein, ensures that the cyclage of the multiple paths is fed into the direct current circuit at a sufficient number per minute to eliminate all flicker and the total result is apparently an increase in the total voltage of the load when the voltage of the source of direct current energy would otherwise be decreasing.

Another point worth mentioning is the interconnection of the transformer secondary windings to break up harmonics of E. M. F. that would otherwise cause disturbance or flicker effect at the lamp load. In this connection it will be observed that the secondary windings of each transformer are connected to and have a definite effect on the secondary windings of adjacent transformers. Note, for example, that secondary winding $A^2$ of transformer T and secondary winding $D^3$ of transformer $T^3$ are both connected across conducting bars 3' and 7' of commutator 15 and that other secondary windings of the different transformers are paired in a similar manner across common conducting bars of the "current" commutator. In computing the cyclage it would be noted that, at a brush speed of 990 R. P. M., each transformer coil would have 16½ cycles per second E. M. F. imposed on it by the positive and negative brushes on the commutator circuit. This would be the main cyclage imposed on the transformers at the potential commutator brushes but since each of the four transformers is receiving a direct impulse eight times per revolution we actually have 16½ cycles by 8/2 equals 66 cycles impressed in the secondary commutator circuit and on the load. There is also a second cyclage built up due to the alternate shunting of the primary coils of the transformers at the potential commutator 14. Since the shunting of the primary coils in sequence occurs fourteen times per revolution this second cyclage equals 115.5 cycles per second. If the transformer secondary windings were not interconnected as above mentioned the successive E. M. F.'s produced by each individual coil would have a tendency to build up so that a harmonic effect of around 9 cycles per second would be produced whereas the double coil interconnection characteristic of the present invention smooths and absorbs this condition so that the combined effect of each pair of coils on the common conducting bars to which they are connected is to increase the "boosting" or "bucking" effect and to simultaneously equalize the effect of one transformer with respect to the next and so on.

It is important to successful use of this invention that the span or coverage of the "current" commutator brushes be greater than the span or coverage of the "potential" commutator brushes. In the present instance the span of the "current" commutator brushes is shown as approximately twice that of the "potential" commutator brushes.

The voltage ratio of the primary to the secondary windings of the transformers depends upon the particular application. In a 32 volt car lighting system the ratio would be approximately 7 volts for each primary and approximately 14 volts for each secondary. In the present instance I have elected to disclose four transformers in order to explain the principles of operation but it will be understood that any desired number of transformers may be employed by increasing the number of conducting bars embodied in the "potential" and "current" commutators. In actual practice efficient regulation has been obtained with eight transformers and two sixteen bar commutators connected in the manner characteristic of this invention.

Having described what are now considered to be the preferred embodiments of this invention, it will be understood that various modifications may be resorted to within the scope and spirit of the appended claims.

It is to be understood that the term "transformer," as used in the appended claims, is intended to cover both standard and auto-transformers.

Having thus described my invention, what I claim is:

1. A system of electrical distribution comprising, in combination, a source of direct current, a load circuit connected in series with said source and voltage regulating means for varying the voltage across the load circuit in relation to the voltage across the terminals of said source, said means comprising a plurality of transformers, each including a plurality of primary windings and a plurality of secondary windings, a rotary potential commutator through which the primary windings of the transformers are connected across the terminals of said source in a definite sequence during rotation of said commutator, a current commutator through which the secondary windings of the transformer are sequentially connected to said source in series with the load circuit, the transformer connections at the commutators being made so that by changing the relative angular setting of the two commutators, the output voltage of the transformers may be caused to have either a "boosting" or a "bucking" effect on the feeder voltage impressed on the load circuit by the direct current source.

2. A voltage regulating system for maintaining a constant D. C. output voltage from a varying source of D. C. comprising, at least 4 transformers, each having two primary windings and two corresponding secondary windings, first and second normally stationary commutators each having twice as many relatively insulated bars as the number of transformers, each commutator having a pair of rotatable brushes bearing thereon each brush of a pair being disposed diametrically from each other, means for rotating all of said brushes together around their respective commutators, means for rotating the first of said commutators through a desired angle, means for electrically connecting a brush of each commutator to one side of the source of D. C., means for electrically connecting the other side of the source to the other brush of the first of said commutators and to a first output conductor, means for electrically connecting the second output conductor to the other brush of the second of said commutators, means for electrically connecting the primary windings of the transformers in a closed ring, the first and second primary windings of each transformer being connected diametrically to each other in the ring, means for electrically connecting the juncture point of each primary winding with each other in rotation to a separate bar of the first commutator, means for electrically connecting the first secondary winding of a first of said transformers in parallel with a second secondary winding of a fourth of said transformers, likewise a first secondary winding of a second transformer with a second secondary of a first transformer, a first secondary winding of a third transformer with a second secondary of a second transformer, and a first secondary winding of a fourth transformer with a second secondary of a third transformer, means for connecting one end of each of the first, second, third and fourth secondary windings in rotation to adjacent commutator segments of said second commutator, means for connecting the other ends of said second windings to commutator segments of said second commutator respectively opposite to those of the first mentioned ends, and means electrically responsive to the output voltage for controlling the means for rotating the first of said commutators.

ALFRED C. TURTLE.